US010075687B2

(12) United States Patent
Yamaguchi

(10) Patent No.: US 10,075,687 B2
(45) Date of Patent: Sep. 11, 2018

(54) IMAGING APPARATUS AND IMAGING METHOD TO OBTAIN HIGH QUALITY LUMINANCE IMAGES

(71) Applicant: SONY CORPORATION, Tokyo (JP)

(72) Inventor: Tadashi Yamaguchi, Saitama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/311,970

(22) PCT Filed: May 20, 2015

(86) PCT No.: PCT/JP2015/064403
§ 371 (c)(1),
(2) Date: Nov. 17, 2016

(87) PCT Pub. No.: WO2015/186510
PCT Pub. Date: Dec. 10, 2015

(65) Prior Publication Data
US 2017/0085850 A1  Mar. 23, 2017

(30) Foreign Application Priority Data
Jun. 3, 2014 (JP) ................. 2014-114627

(51) Int. Cl.
*H04N 9/64* (2006.01)
*H04N 5/232* (2006.01)
(Continued)

(52) U.S. Cl.
CPC ............ *H04N 9/646* (2013.01); *G06T 3/40* (2013.01); *G06T 3/4015* (2013.01); *H04N 5/232* (2013.01);
(Continued)

(58) Field of Classification Search
CPC ........ H04N 9/646; H04N 9/045; H04N 5/232; H04N 5/374; G06T 3/4015; G06T 3/40; G06T 2207/10024
See application file for complete search history.

(56) References Cited

U.S. PATENT DOCUMENTS

| | | | | |
|---|---|---|---|---|
| 2003/0048493 | A1* | 3/2003 | Pontifex | ............... H04N 5/243 358/514 |
| 2009/0226086 | A1* | 9/2009 | Kasahara | ............... H04N 5/20 382/167 |
| 2013/0215318 | A1* | 8/2013 | Ino | ............... H04N 5/3572 348/335 |

FOREIGN PATENT DOCUMENTS

| | | |
|---|---|---|
| JP | 2011-109231 A | 6/2011 |
| JP | 2012-191539 A | 10/2012 |
| JP | 2012-230401 A | 11/2012 |

OTHER PUBLICATIONS

International Search Report and Written Opinion Received for PCT Application No. PCT/JP2015/064403, dated Jul. 28, 2015, 04 pages of English Translation and 05 pages of ISRWO.

(Continued)

*Primary Examiner* — Gevell Selby
(74) *Attorney, Agent, or Firm* — Chip Law Group

(57) ABSTRACT

The present technology relates to an imaging apparatus, an imaging method, and a program that are capable of obtaining a higher-quality luminance image. The imaging apparatus captures a luminance image with a monochrome image sensor and also captures a color image with a color image sensor. A magnification aberration amount determination unit analyzes the amount of magnification chromatic aberration of each image height position on the basis of information on magnification chromatic aberration of a lens unit. A recording image selection unit selects the luminance image captured with the monochrome image sensor or a (Continued)

luminance image obtained from the color image captured with the color image sensor on the basis of the result of the analysis on the amount of magnification chromatic aberration, and sets the selected luminance image as a recording image. When a luminance image is selected in accordance with the amount of magnification chromatic aberration in such a manner, a high-quality recording image with less blurring resulting from the magnification chromatic aberration can be obtained. The present technology can be applied to a digital still camera.

9 Claims, 8 Drawing Sheets

(51) Int. Cl.
    *G06T 3/40*     (2006.01)
    *H04N 9/04*     (2006.01)
    *H04N 5/374*     (2011.01)

(52) U.S. Cl.
    CPC ... *H04N 9/045* (2013.01); *G06T 2207/10024* (2013.01); *H04N 5/374* (2013.01)

(56) References Cited

OTHER PUBLICATIONS

International Preliminary Report on Patentability received for PCT Application No. PCT/JP2015/064403, dated Dec. 6, 2016, p. 04.

\* cited by examiner

| Image height position | R correction magnification | B correction magnification |
|---|---|---|
| 0.2 | −0.0006 | 0.0006 |
| 0.4 | −0.0007 | 0.0006 |
| 0.6 | −0.0008 | 0.0008 |
| 0.8 | −0.0009 | 0.0009 |
| 1 | −0.001 | 0.001 |

IMAGING APPARATUS AND IMAGING METHOD TO OBTAIN HIGH QUALITY LUMINANCE IMAGES

CROSS REFERENCE TO RELATED APPLICATIONS

This application is a U.S. National Phase of International Patent Application No. PCT/JP2015/064403 filed on May 20, 2015, which claims priority benefit of Japanese Patent Application No. JP 2014-114627 filed in the Japan Patent Office on Jun. 3, 2014. Each of the above-referenced applications is hereby incorporated herein by reference in its entirety.

TECHNICAL FIELD

The present technology relates to an imaging apparatus, an imaging method, and a program, and particularly to, an imaging apparatus, an imaging method, and a program that are capable of obtaining a higher-quality luminance image.

BACKGROUND ART

In the past, the fact that a color shift due to magnification chromatic aberration of an imaging lens leads to blurring in an edge portion of a captured image has been known. In this regard, a technology of performing magnification chromatic aberration correction on a captured color image including an R image, a G image, and a B image is proposed (see, for example, Patent Document 1).

In such magnification chromatic aberration correction, for example, the amounts of color shift of R and B signals with respect to a G signal are acquired from optical design data or the captured image at each image height position of the captured image, to perform enlargement processing or reduction processing on the R image and the B image on the basis of the amounts of color shift. Thus, the magnification chromatic aberration is corrected.

Patent Document 1: Japanese Patent Application Laid-open No. Hei 6-205273

SUMMARY OF INVENTION

Problem to be Solved by the Invention

Incidentally, in the case where a color image is captured, a captured image is corrected by the above-mentioned technology to remove blurring resulting from magnification chromatic aberration.

However, for a monochrome image captured with a monochrome image sensor, i.e., a luminance image, the above-mentioned correction of the magnification chromatic aberration cannot be performed in principle. This is because the monochrome image sensor cannot capture a color image, i.e., an image having different colors.

In particular, when a luminance image is captured with use of a lens having large magnification chromatic aberration in a camera including a monochrome image sensor capable of acquiring a high-resolution luminance image, blurring in an edge portion becomes large due to the magnification chromatic aberration. This reduces the quality of the luminance image.

The present technology has been made in view of such circumstances and can obtain a higher-quality luminance image.

Means for Solving the Problem

According to an aspect of the present technology, there is provided an imaging apparatus including: a magnification chromatic aberration correction unit that performs magnification chromatic aberration correction on a color image, the color image being obtained by imaging of a subject via a lens unit; and an image selection unit that selects and outputs any one of a first luminance image and a second luminance image on the basis of the amount of magnification chromatic aberration of the lens unit, the first luminance image being obtained by the imaging of the subject via the lens unit, the second luminance image being obtained from the color image subjected to the magnification chromatic aberration correction.

The image selection unit may select any one of the first luminance image and the second luminance image for each image height.

The image selection unit may select the second luminance image, when an absolute value of the amount of magnification chromatic aberration at the image height is equal to or larger than a threshold value.

The imaging apparatus may further include an image size conversion unit that converts a size of the second luminance image into the same size as the first luminance image, in which the image selection unit may select any one of the first luminance image and the second luminance image having the size converted by the image size conversion.

The imaging apparatus may further include: a color-image capturing unit that captures the color image; and a luminance-image capturing unit that captures the first luminance image.

The color-image capturing unit and the luminance-image capturing unit may have different sizes.

The imaging apparatus may further include an image conversion unit that converts the color image into the second luminance image, the color image including images of respective color components of R, G, and B.

According to an aspect of the present technology, there is provided an imaging method or a program, including the steps of: performing magnification chromatic aberration correction on a color image, the color image being obtained by imaging of a subject via a lens unit; and selecting and outputting any one of a first luminance image and a second luminance image on the basis of the amount of magnification chromatic aberration of the lens unit, the first luminance image being obtained by the imaging of the subject via the lens unit, the second luminance image being obtained from the color image subjected to the magnification chromatic aberration correction.

In one aspect of the present technology, magnification chromatic aberration correction is performed on a color image obtained by imaging of a subject via a lens unit, and any one of a first luminance image and a second luminance image is selected and output on the basis of the amount of magnification chromatic aberration of the lens unit, the first luminance image being obtained by the imaging of the subject via the lens unit, the second luminance image being obtained from the color image subjected to the magnification chromatic aberration correction.

Effects of the Invention

According to one aspect of the present technology, it is possible to obtain a higher-quality luminance image.

It should be noted that the effects described here are not necessarily limited and may be any effects described in this disclosure.

MODE(S) FOR CARRYING OUT THE INVENTION

Hereinafter, an embodiment to which the present technology is applied will be described with reference to the drawings.

<First Embodiment>
<Outline of Present Technology>

First, the outline of the present technology will be described.

Figure 1:
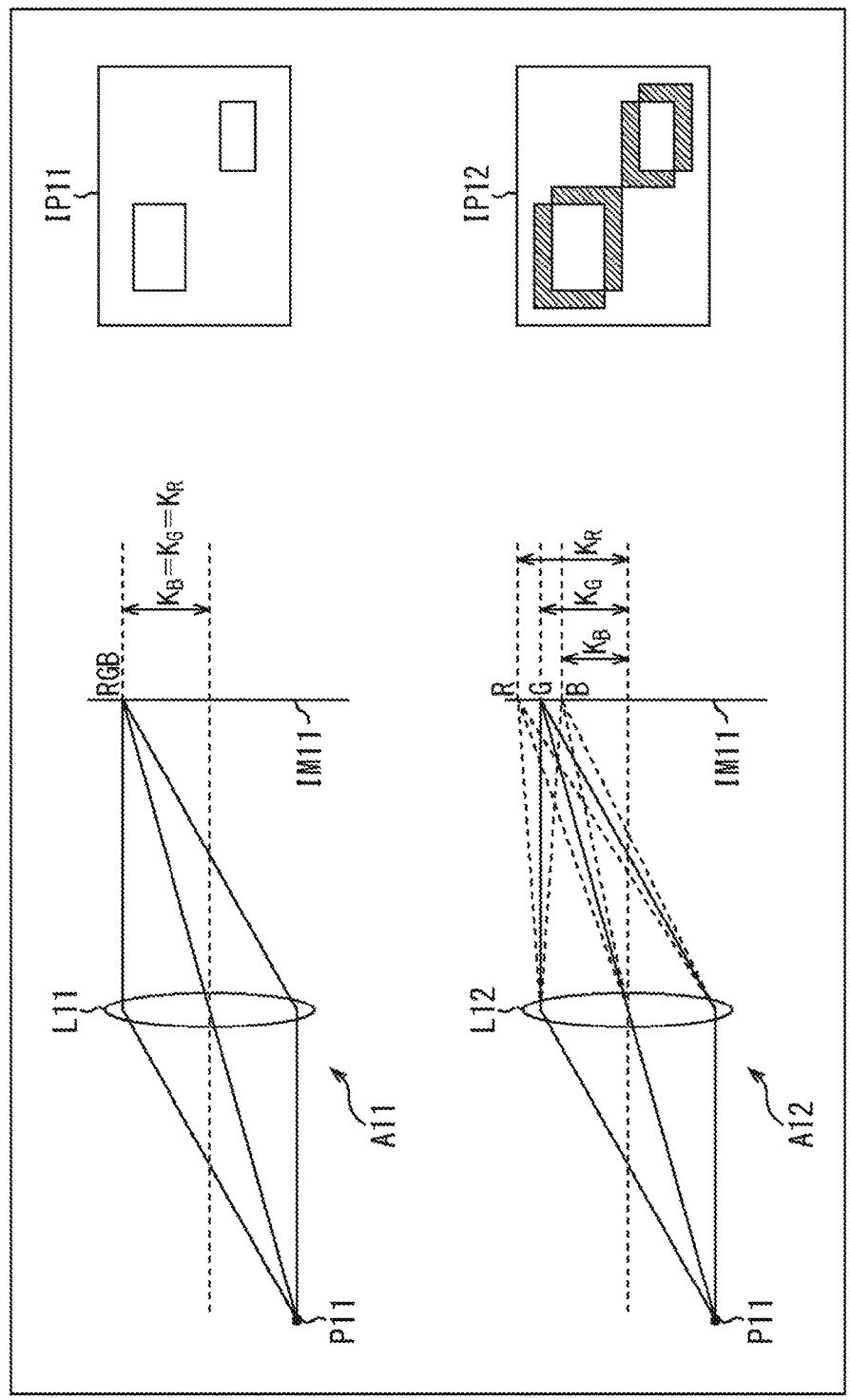
FIG. 1 is a diagram for describing magnification chromatic aberration.

For example, it is assumed that, as indicated by the arrow A11 of FIG. 1, light from an arbitrary point P11 is condensed by a lens L11 having no magnification chromatic aberration, and an image of the light from the point P11 is formed on a color image sensor IM11.

Here, the color image sensor IM11 includes pixels of respective colors of R (red), G (green), and B (blue), and a captured image IP11 including an R image, a G image, and a B image of the respective color components is thus obtained by imaging.

In this example, the lens L11 has no magnification chromatic aberration, and thus image-forming positions of the light from the point P11, the light having the respective colors R, G, and B, are the same on the color image sensor IM11. In other words, assuming that distances (heights) from the optical axis of the lens L11 to the image-forming positions of the light having the respective colors R, G, and B on the color image sensor IM11 are $K_R$, $K_G$, and $K_B$, respectively, the following expression is obtained: $K_B = K_G = K_R$.

Hence, the captured image IP11, which is obtained when the color image sensor IM11 captures an image of a subject, is a high-quality image without blurring at an edge portion of the subject.

In contrast to this, it is assumed that, as indicated by the arrow A12, light from the point P11 is condensed by a lens L12 having magnification chromatic aberration, and an image of the light from the point P11 is formed on the color image sensor IM11.

In such a case, shifts (differences) occur in optical paths of the light having the respective colors R, G, and B due to the magnification chromatic aberration of the lens L12. Hence, as shown in the lower part of the figure, the distances $K_R$, $K_G$, and $K_B$ from the optical axis of the lens L12 to the image-forming positions of the light having the respective colors R, G, and B on the color image sensor IM11 are different from one another. This leads to shifts at the image-forming positions.

In this case, as shown in the lower right of the figure, a captured image IP12, which is obtained when the color image sensor IM11 captures an image of the subject, is an image having blurring at the edge portion of the subject. In this example, shaded areas of the captured image IP12 represent the blurring.

Figure 2:
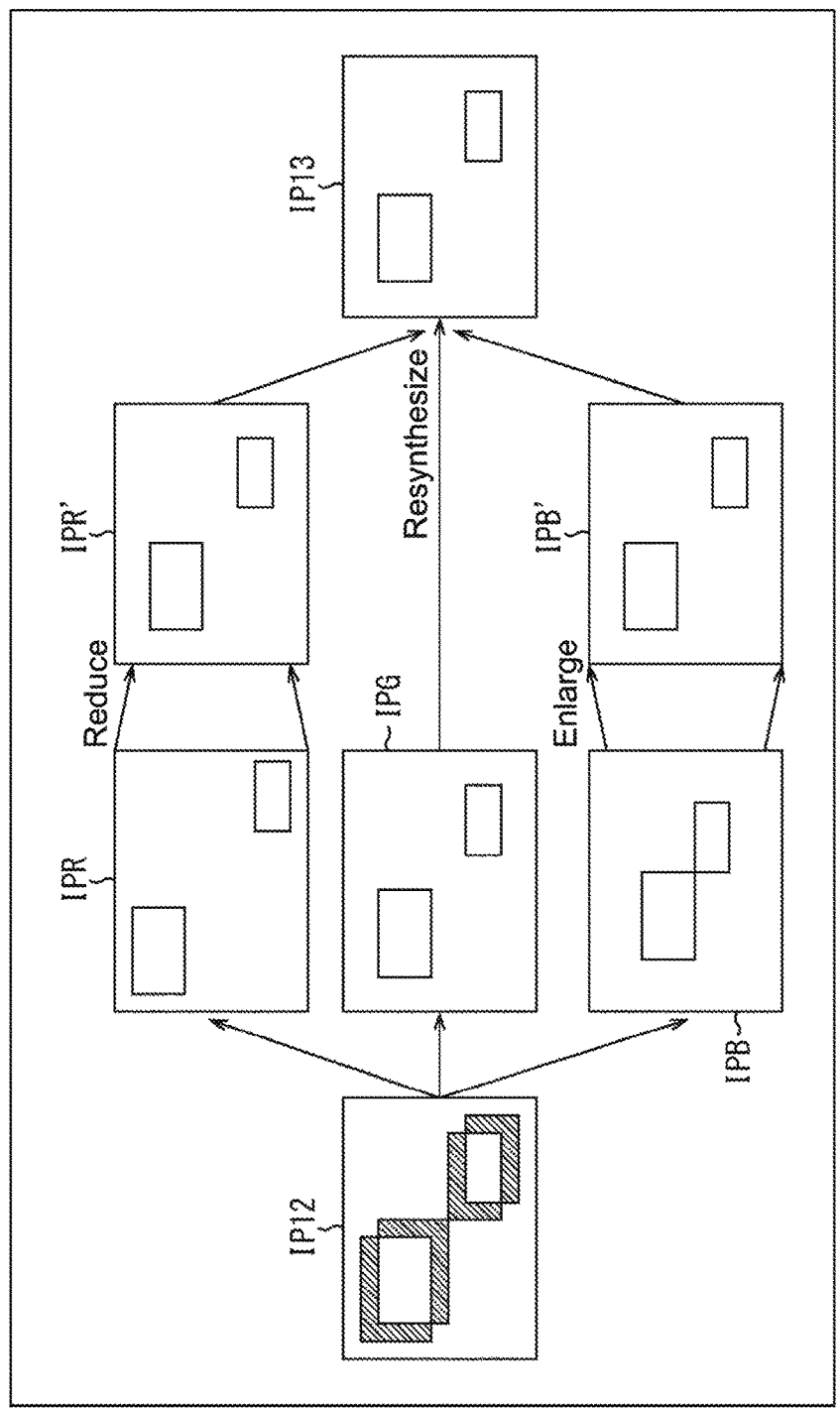
FIG. 2 is a diagram for describing correction of the magnification chromatic aberration.

In this regard, a technology is known in which when an color image is captured, as shown in FIG. 2, the magnification chromatic aberration is corrected using an R image IPR, a G image IPG, and a B image IPB that constitute the captured image IP12 serving as a color image, so that a captured image IP13 with reduced blurring is obtained.

In this example, the R image IPR is reduced on the basis of the magnification chromatic aberration to obtain an R image IPR', whereas the B image IPB is enlarged on the basis of the magnification chromatic aberration to obtain a B image IPB'. The R image IPR', the G image IPG, and the B image IPB' are then resynthesized to obtain a final color image, i.e., the captured image IP13.

As described above, when the captured image is a color image, the shifts at the image-forming positions of the respective color components, which are generated due to the magnification chromatic aberration, can be corrected, so that a high-quality image without blurring can be obtained. When the captured image is a luminance image, however, the luminance image does not contain information on color components and thus cannot correct the shifts generated due to the magnification chromatic aberration by the above-mentioned method.

In this regard, in the present technology, a monochrome image sensor and a color image sensor are used to capture a luminance image and a color image, respectively, and a final luminance image (hereinafter, also referred to as recording image) is obtained from the captured luminance image and a luminance image obtained from the color image.

Specifically, at each position from the center of the recording image, i.e., at each image height, any one of the captured luminance image and a luminance image obtained from the color image is selected as a recording image, on the basis of information on magnification chromatic aberration at each image height. In other words, in the captured luminance image and a luminance image obtained from the color image, an image with less blurring is selected as a recording image. With this configuration, a high-quality image with less blurring can be obtained.

<Configuration Example of Imaging Apparatus>

Next, a specific embodiment to which the present technology is applied will be described.

Figure 3:
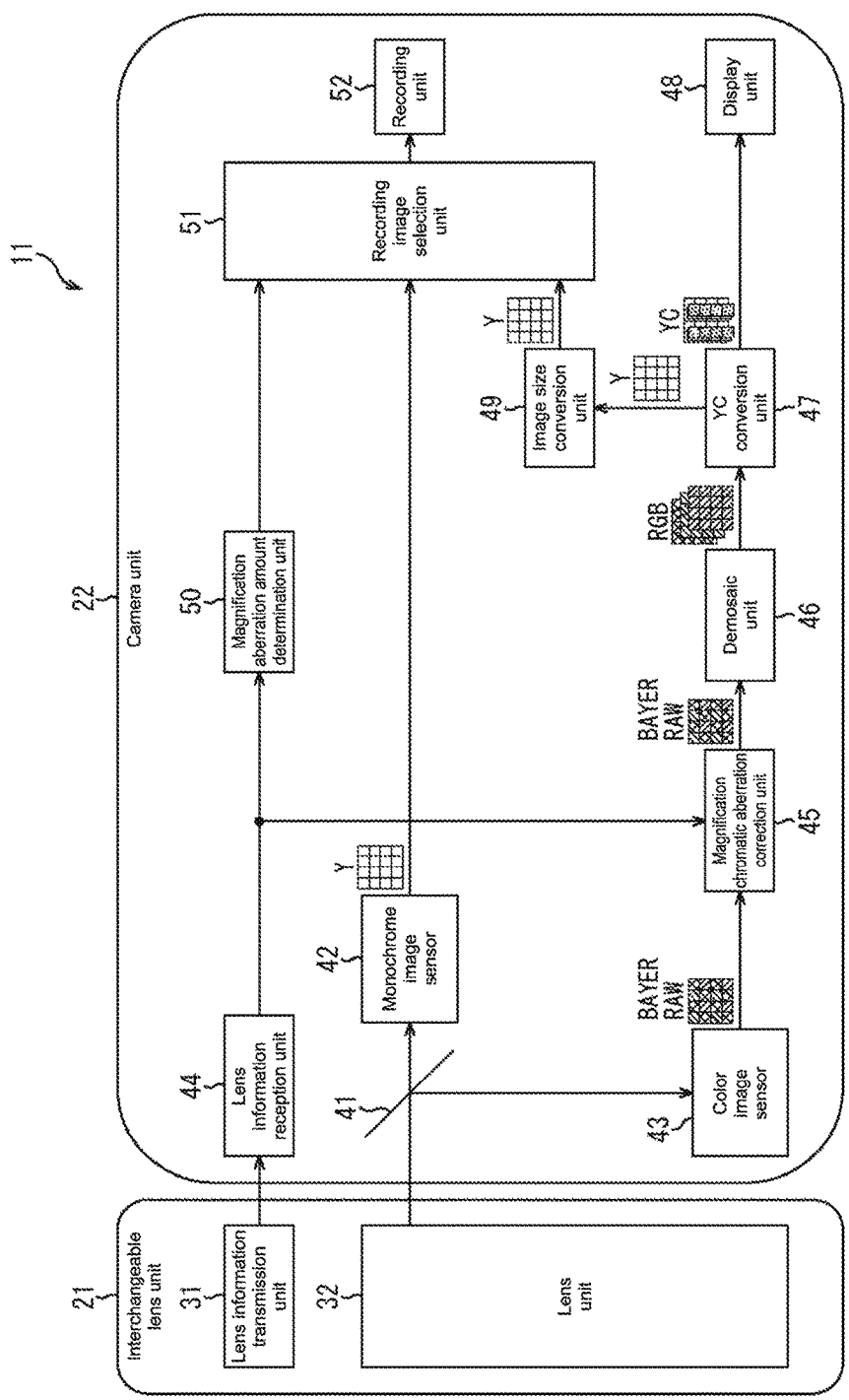
FIG. 3 is a diagram showing a configuration example of an imaging apparatus.

FIG. 3 is a diagram showing a configuration example of an embodiment of the imaging apparatus to which the present technology is applied.

An imaging apparatus 11 shown in FIG. 3 is, for example, a digital still camera or a digital video camera. The imaging apparatus 11 includes an interchangeable lens unit 21 and a camera unit 22.

The interchangeable lens unit 21 is attachable to and detachable from the camera unit 22. The interchangeable lens unit 21 includes a lens information transmission unit 31 and a lens unit 32.

The lens information transmission unit 31 records various types of information on characteristics of the lens unit 32 and transfers the recorded information to the camera unit 22. For example, the lens information transmission unit 31 records magnification chromatic aberration information as lens information. The magnification chromatic aberration information is information on magnification chromatic aberration at each image height on an imaging surface of the lens unit 32, i.e., on a captured image.

The lens unit 32 includes one or more lenses and apertures and the like. The lens unit 32 condenses light incident from the subject and guides the light to the camera unit 22.

Further, the camera unit 22 includes a beam splitter 41, a monochrome image sensor 42, a color image sensor 43, a lens information reception unit 44, a magnification chromatic aberration correction unit 45, a demosaic unit 46, a YC conversion unit 47, a display unit 48, an image size conversion unit 49, a magnification aberration amount determination unit 50, a recording image selection unit 51, and a recording unit 52.

The beam splitter 41 divides (splits) the incident light from the lens unit 32 at a predetermined proportion and guides the light to the monochrome image sensor 42 and the color image sensor 43. In other words, the beam splitter 41 causes part of the incident light from the lens unit 32 to pass therethrough and enter the monochrome image sensor 42, and also reflects part of the incident light from the lens unit 32 to enter the color image sensor 43.

It should be noted that the proportion at which the beam splitter 41 divides the incident light, that is, the beam splitter 41 reflects the incident light (or causes the incident light to pass therethrough), may be any proportion. For example, when the proportion at which the incident light is divided is approximately 50%, the beam splitter 41 is a half mirror.

The monochrome image sensor 42 is, for example, an imaging element such as a CMOS (Complementary Metal-Oxide Semiconductor) image sensor. The monochrome image sensor 42 receives the incident light from the beam splitter 41, performs photoelectric conversion to capture a luminance image, and supplies the luminance image to the recording image selection unit 51.

The imaging surface of the monochrome image sensor 42 is not provided with color filters. Thus, in the monochrome image sensor 42, a luminance image containing only luminance information, i.e., a monochrome image is obtained. In particular, in the monochrome image sensor 42, all pixels (photodiodes) provided on the imaging surface are used to capture a luminance image, so that a high-resolution luminance image can be obtained.

The color image sensor 43 is, for example, an imaging element such as a CMOS image sensor. The color image sensor 43 receives the incident light from the beam splitter 41, performs photoelectric conversion to capture a color image, and supplies the color image to the magnification chromatic aberration correction unit 45.

On the imaging surface of the color image sensor 43, color filters having respective colors of R, G, and B are provided in a Bayer array, for example. Hence, in the color image sensor 43, a color image including images of the respective color components, i.e., the R image, the G image, and the B image, is obtained.

It should be noted that, more specifically, the image captured with the color image sensor 43 is a RAW image in which each pixel has color information of any one of R, G, and B. The RAW image is subjected to demosaic processing, and a color image is thus obtained.

Further, in the camera unit 22, basically, the monochrome image sensor 42 is assumed as an imaging element for obtaining an image for recording, and the color image sensor 43 is assumed as an imaging element for obtaining an image for live view.

Hence, the size (the number of pixels) of the monochrome image sensor 42 is larger than the size of the color image sensor 43. In other words, more specifically, the size (the number of pixels) of the luminance image obtained with the monochrome image sensor 42 is larger than the size (the number of pixels) of the color image obtained with the color image sensor 43.

Hence, in this example, the luminance image is a higher-definition (higher-resolution) image, i.e., a higher-quality image than the color image. In particular, in the monochrome image sensor 42, the luminance information is obtained for all the pixels and there is no need for performing supplement. Thus, the luminance image obtained with the monochrome image sensor 42 is a higher-definition image than the color image for which color information is supplemented.

The lens information reception unit 44 receives the lens information transferred (transmitted) from the lens information transmission unit 31 and supplies the lens information to the magnification chromatic aberration correction unit 45 and the magnification aberration amount determination unit 50.

The magnification chromatic aberration correction unit 45 performs magnification chromatic aberration correction on the RAW image, which is supplied from the color image sensor 43, on the basis of the magnification chromatic aberration information serving as the lens information supplied from the lens information reception unit 44. The magnification chromatic aberration correction unit 45 then supplies the resultant RAW image to the demosaic unit 46.

The demosaic unit 46 performs demosaic processing on the RAW image supplied from the magnification chromatic aberration correction unit 45 and converts the RAW image into a color image including an R image, a G image, and a B image. The demosaic unit 46 supplies the obtained color image to the YC conversion unit 47.

The YC conversion unit 47 performs color space conversion on the color image supplied from the demosaic unit 46. Thus, the color image is converted into an image in a YC space from the image in the RGB space. In other words, by the color space conversion, the color image including the R image, the G image, and the B image is converted into a color image including a luminance image (Y image) and a color-difference image (Cr image and Cb image).

The YC conversion unit 47 supplies the color image including the luminance image and the color-difference image to the display unit 48 and also supplies the luminance image constituting the color image to the image size conversion unit 49.

The display unit 48 is, for example, a liquid crystal display panel or an organic EL (Electro Luminescence) panel. The display unit 48 displays the color image, which is supplied from the YC conversion unit 47, as a live view image.

For example, the display unit 48 functions as a display panel or an EVF (Electronic View Finder) of the imaging apparatus 11. Hence, when a user takes an image with the imaging apparatus 11, the user checks the angle of view and the like while seeing a live view image displayed in the display unit 48.

It should be noted that an example of displaying the color image serving as a live view image will be described below, but it may be possible to display only a luminance image, which constitutes the color image, as a live view image.

The image size conversion unit 49 performs image size conversion processing on the luminance image, which is supplied from the YC conversion unit 47, in accordance with the size of the luminance image captured with the monochrome image sensor 42. The image size conversion unit 49 then supplies the resultant luminance image to the recording image selection unit 51.

The magnification aberration amount determination unit 50 analyzes the amount of magnification chromatic aberration of the interchangeable lens unit 21 on the basis of the magnification chromatic aberration information serving as the lens information supplied from the lens information reception unit 44. The magnification aberration amount determination unit 50 then supplies a replacement signal to the recording image selection unit 51, the replacement signal indicating whether the luminance image is replaced or not according to the result of the analysis. In other words, the magnification aberration amount determination unit 50 generates a replacement signal on the basis of the amount of magnification chromatic aberration of the interchangeable lens unit 21, and supplies the replacement signal to the recording image selection unit 51.

The recording image selection unit 51 selects, at each image height, any one of the luminance image supplied from the monochrome image sensor 42 and the luminance image supplied from the image size conversion unit 49, on the basis of the replacement signal supplied from the magnification aberration amount determination unit 50, to set the selected luminance image as a recording image. The recording image selection unit 51 then outputs the selected luminance image to the recording unit 52.

The recording unit 52 records the recording image, which is supplied from the recording image selection unit 51, on a recording medium (not shown). It should be noted that the size of the recording image is here assumed to be the same as the size of the monochrome image sensor 42, that is, the size of the luminance image obtained with the monochrome image sensor 42.

It should be noted that in FIG. 3, the color image sensor 43 is an image sensor for acquiring a live view image, but may be an image sensor for capturing a moving image.

<Description on Lens Information Transfer Processing>

Subsequently, an operation of the imaging apparatus 11 will be described.

For example, when the user connects the interchangeable lens unit 21 to the camera unit 22, the imaging apparatus 11 starts lens information transfer processing of transferring lens information. Hereinafter, the lens information transfer processing by the imaging apparatus 11 will be described with reference to the flowchart of FIG. 4.

In Step S11, the lens information transmission unit 31 reads lens information recorded therein and transmits the recorded lens information to the lens information reception unit 44.

In Step S12, the lens information reception unit 44 receives the lens information transmitted from the lens information transmission unit 31, and supplies the lens information to the magnification chromatic aberration correction unit 45 and the magnification aberration amount determination unit 50. The lens information transfer processing is terminated.

Figures 4, 5:
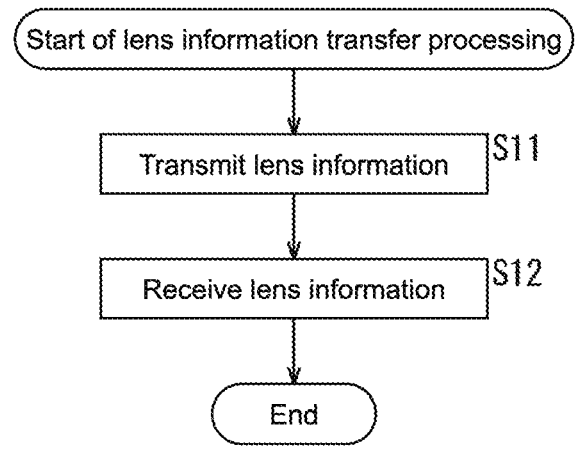
FIG. 4 is a flowchart for describing lens information transfer processing.
FIG. 5 is a diagram showing an example of magnification chromatic aberration information.

Here, for the lens information, for example, magnification chromatic aberration information shown in FIG. 5 is transferred between the lens information transmission unit 31 and the lens information reception unit 44.

The magnification chromatic aberration information shown in FIG. 5 includes an R correction magnification for correcting the magnification chromatic aberration of the R image at each image height position and a B correction magnification for correcting the magnification chromatic aberration of the B image at each image height position.

For example, the R correction magnification at each image height position indicates a correction magnification of the R image with respect to the G image, that is, by how many-fold the R image is enlarged to be matched with the G image. Similarly, the B correction magnification at each image height position indicates a correction magnification of the B image with respect to the G image. Here, correction magnifications with a positive sign indicate magnification for enlargement, and correction magnifications with a negative sign indicate magnification for reduction. Further, each image height position is expressed in proportion to an image height position "1", which is set for the highest image height position. For example, an image height position "0.8" is the height position of eight-tenths (80 percent) of the image height position "1".

In this example, the R correction magnification at the image height position "1" is "−0.001", and the B correction magnification at the image height position "1" is "0.001".

In such a manner, the camera unit 22 acquires the lens information from the interchangeable lens unit 21. The lens information is acquired in such a manner, and the magnification chromatic aberration of the color image can thus be precisely corrected.

It should be noted that more specifically, the correction magnification at each image height position, which is shown in the magnification chromatic aberration information, i.e., the magnification chromatic aberration of the lens unit 32, varies depending on a focal distance determined by a position of a zoom lens of the lens unit 32 or on an aperture value of the aperture constituting the lens unit 32. In other words, when the zoom magnification of the lens unit 32 is changed or the aperture amount is changed, the magnification chromatic aberration is changed.

Hence, more specifically, the lens information transmission unit 31 holds the magnification chromatic aberration information for each combination of the focal distance and the aperture value of the lens unit 32. The lens information reception unit 44 acquires the magnification chromatic aberration information of all the combinations from the lens information transmission unit 31. The lens information reception unit 44 selects a piece of magnification chromatic aberration information from the acquired pieces of magnification chromatic aberration information in accordance with the focal distance and the aperture value of the lens unit 32. The lens information reception unit 44 supplies the selected piece of magnification chromatic aberration information to the magnification chromatic aberration correction unit 45 and the magnification aberration amount determination unit 50.

Further, the description that the lens information is transferred at a timing at which the interchangeable lens unit 21 is connected to the camera unit 22 has been given here, but the lens information may be transferred at a timing at which capturing of the luminance image is specified.

In such a case, the lens information transmission unit 31 selects the lens information (magnification chromatic aberration information) determined by the focal distance and the aperture value of the lens unit 32 at a time point at which capturing of the luminance image is specified, that is, when a luminance image is captured. The lens information transmission unit 31 then transmits the lens information to the lens information reception unit 44.

Additionally, when the luminance image is captured, the lens information reception unit 44 and the like may detect the magnification chromatic aberration on the basis of the color image captured simultaneously with the luminance image, and generate magnification chromatic aberration information as lens information on the basis of the result of the detection.

<Description on Live View Display Processing>

Figure 6:
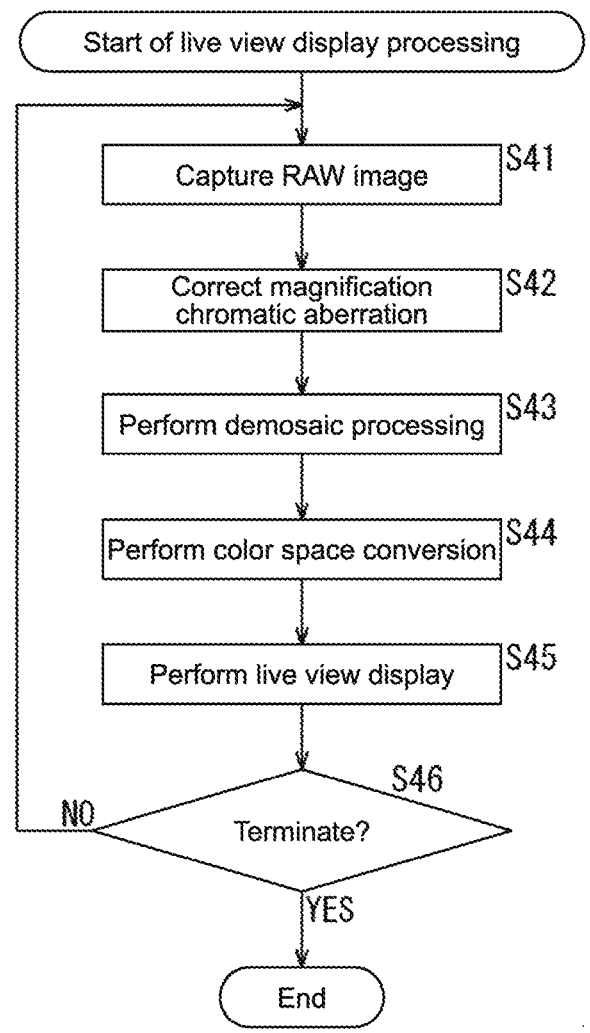
FIG. 6 is a flowchart for describing live view display processing.

Further, when the user turns on the imaging apparatus 11 so as to capture a luminance image, the imaging apparatus 11 takes in an image of a subject and starts live view display processing of displaying a live view image. Hereinafter, the live view display processing by the imaging apparatus 11 will be described with reference to the flowchart of FIG. 6.

In Step S41, the color image sensor 43 receives the incident light from the beam splitter 41, performs photoelectric conversion to capture a RAW image, and supplies the RAW image to the magnification chromatic aberration correction unit 45. In other words, the color image sensor 43 captures an image of the subject via the lens unit 32 and the beam splitter 41 and thus obtains a RAW image.

In Step S42, the magnification chromatic aberration correction unit 45 corrects magnification chromatic aberration of the RAW image, which is supplied from the color image sensor 43, on the basis of the magnification chromatic aberration information serving as the lens information supplied from the lens information reception unit 44. The magnification chromatic aberration correction unit 45 then supplies the resultant RAW image to the demosaic unit 46.

Specifically, the magnification chromatic aberration correction unit 45 enlarges or reduces a pixel area corresponding to each image height position of the RAW image, on the basis of the R correction magnification and the B correction magnification at each image height position shown in the magnification chromatic aberration information, to correct the magnification chromatic aberration. In other words, an R-component area included in the RAW image is reduced by the R correction magnification, and a B-component area included in the RAW image is enlarged by the B correction magnification.

It should be noted that a method of correcting the magnification chromatic aberration for the RAW image may be any method, for example, an existing method of correcting the magnification chromatic aberration.

In Step S43, the demosaic unit 46 performs demosaic processing on the RAW image supplied from the magnification chromatic aberration correction unit 45 and supplies the resultant color image to the YC conversion unit 47.

For example, the demosaic unit 46 performs supplement for pixels having no color information on the RAW image, for each color component, by using pixels located around the pixels having no color information, to thus generate a color image including color information of R, G, and B in the respective pixels. Thus, a color image including an R image, a G image, and a B image is obtained.

In Step S44, the YC conversion unit 47 performs color space conversion on the color image supplied from the demosaic unit 46 and generates a color image including a luminance image and a color-difference image, to supply the color image to the display unit 48.

In Step S45, the display unit 48 performs live view display on the basis of the color image supplied from the YC conversion unit 47. In other words, the display unit 48 displays the color image as a live view image.

It should be noted that the color image or the luminance image may be displayed as a live view image on an external display connected to the imaging apparatus 11 through a wired cable or the like.

In Step S46, the camera unit 22 determines whether to terminate the processing or not. For example, when the user operates a power button (not shown) of the camera unit 22 to turn the power off, the camera unit 22 determines that the processing is terminated.

In Step S46, when the camera unit 22 determines that the processing is not terminated, the processing returns to Step S41 and the above-mentioned processing is repeated.

In contrast to this, in Step S46, when the camera unit 22 determines that the processing is terminated, the camera unit 22 terminates the processing of each unit. Thus, the live view display processing is terminated.

As described above, when the imaging apparatus 11 is turned on, the imaging apparatus 11 starts imaging for live view display, and displays the obtained color image as a live view image.

<Description on Imaging Processing>

When the live view display processing is started and a live view image is displayed, the user takes an image while seeing a live view image and checking the angle of view and the like. In other words, the user presses down a shutter button (not shown) of the camera unit 22 to give an instruction to capture a luminance image (recording image).

When the user operates the shutter button to give an instruction to capture a luminance image, the imaging apparatus 11 captures a luminance image and generates a recording image, to perform imaging processing that is processing of recording the obtained recording image. Hereinafter, the imaging processing performed by the imaging apparatus 11 will be described with reference to the flowchart of FIG. 7.

In Step S71, the monochrome image sensor 42 receives the incident light from the beam splitter 41, performs photoelectric conversion to capture a luminance image, and supplies the luminance image to the recording image selection unit 51. In other words, the monochrome image sensor 42 captures an image of the subject via the lens unit 32 and the beam splitter 41, to obtain a luminance image.

After a luminance image is captured, processing of Steps S72 to S75 are performed to generate a color image. Such processing are similar to the processing of Steps S41 to S44 of FIG. 6, and thus description thereof will be omitted.

It should be noted that, more specifically, capturing of a luminance image in Step S71 and capturing of a RAW image in Step S72 are performed at the same time. In other words, images having the same angle of view are simultaneously captured with the monochrome image sensor 42 and the color image sensor 43 via the beam splitter 41.

In Step S76, the camera unit 22 selects an image height position to be processed.

Figure 8:
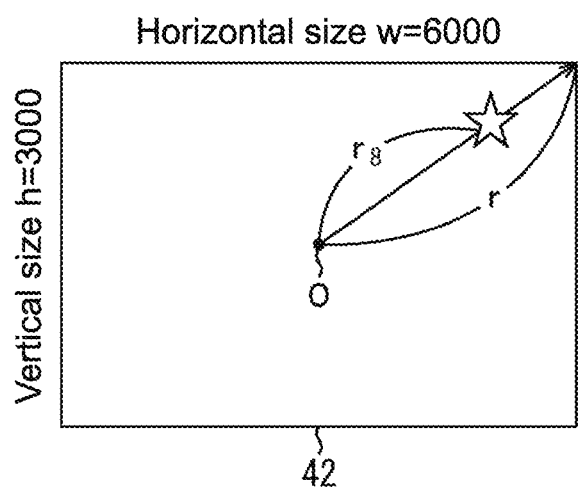
FIG. 8 is a diagram for describing an image height position.

For example, as shown in FIG. 8, it is assumed that the center position of the monochrome image sensor 42 is the center O, and the length from the center O to one vertex of the rectangular imaging surface of the monochrome image sensor 42 is a diagonal length r.

It is assumed that the horizontal length of the monochrome image sensor 42 in the figure has a horizontal size w of 6000 (pixels), and the vertical length of the monochrome image sensor 42 in the figure has a vertical size h of 3000 (pixels). In this case, the length $r=((w^2+h^2)^{1/2})/2$. When 6000 and 3000 are respectively substituted into w and h of the equation expressing the length r, the length r=3354.

Here, it is assumed that the position of the center O is the position of zero-tenths (0 percent) of the image height position, and the position of the length r from the center O is the position of ten-tenths (100 percent) of the image height position. Additionally, it is assumed that the position of the length r*x/10 from the center O is the position of x-tenths of the image height position (0≤x≤10), and the length from the center O to the position of x-tenths of the image height position is represented by $r_x$.

In this case, for example, as shown in FIG. 8, the length (distance) $r_8$ from the center O to the position of x-tenths of the image height position is: $r_8$=r*0.8=2683. Further, for example, in the example shown in FIG. 5, the image height position "0.8" in the magnification chromatic aberration information is the position of eight-tenths of the image height position.

It should be noted that the luminance image captured with the monochrome image sensor 42 and a recording image to be obtained have the same size, i.e., the same number of pixels in a horizontal direction and a vertical direction. Hence, the position of the length $r_x$ from the center of the monochrome image sensor 42, i.e., the position of x-tenths of the image height position, corresponds to the position of the length $r_x$ from the center of the recording image.

Hereinafter, the position of the luminance image or the recording image, which corresponds to the image height position of the monochrome image sensor 42, can also be referred to simply as an image height position of the luminance image or the recording image.

Figure 7:
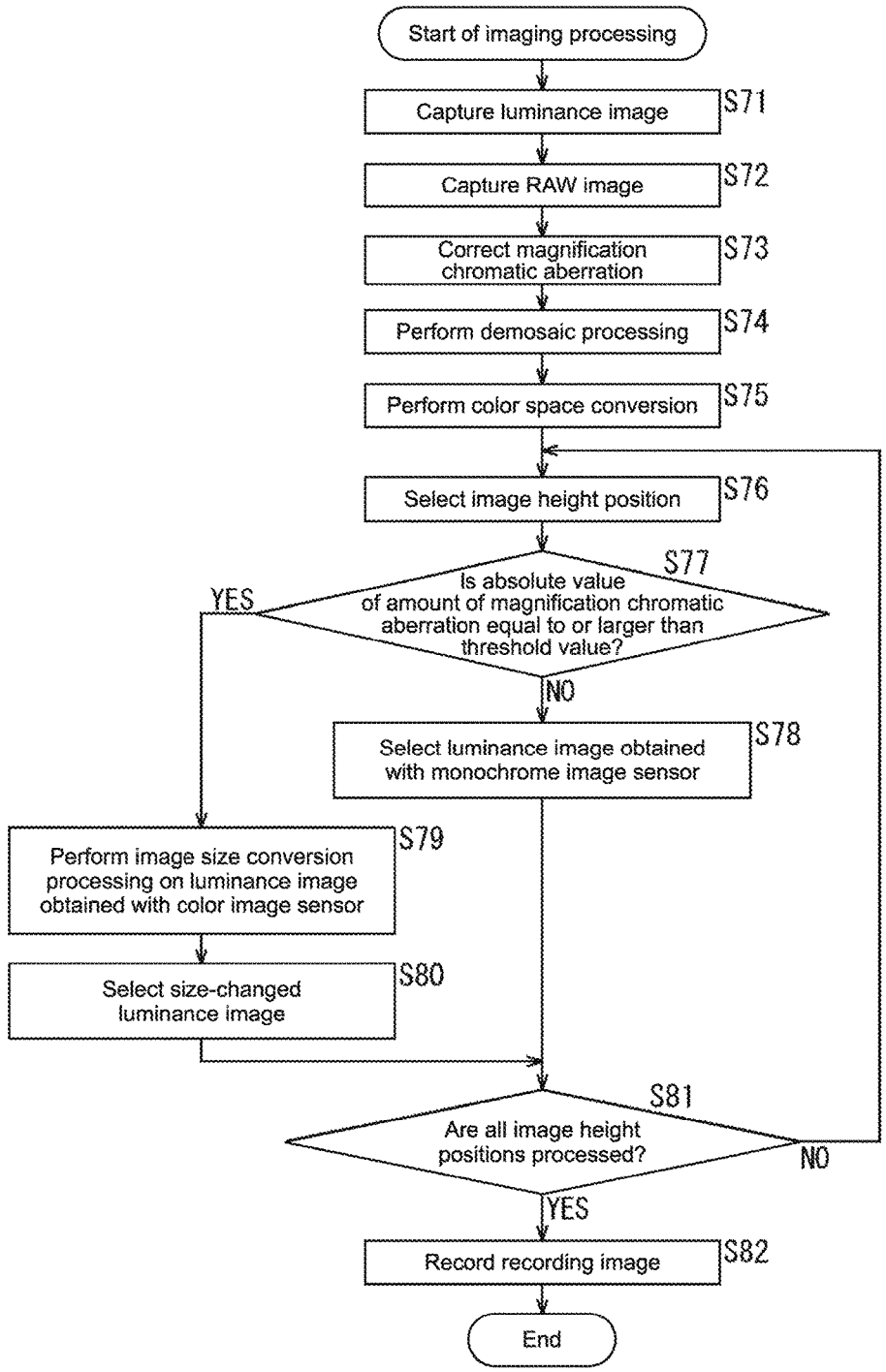
FIG. 7 is a flowchart for describing imaging processing.

Referring back to the description of the flowchart of FIG. 7, the camera unit 22 selects the image height position of the monochrome image sensor 42 in order from the position of zero-tenths (0 percent) of the image height position to the position of ten-tenths (100 percent) of the image height position by one-tenth (10 percent). It should be noted that hereinafter, the image height position selected in Step S76 can also be referred to as an image height position to be processed.

In Step S77, the magnification aberration amount determination unit 50 determines whether the absolute value of the amount of magnification chromatic aberration Δ at an image height position to be processed is equal to or larger than a predetermined threshold value th, on the basis of the magnification chromatic aberration information as the lens information supplied from the lens information reception unit 44.

For example, the magnification aberration amount determination unit 50 calculates a product of the length $r_x$ to the position of x-tenths of the image height position and a correction magnification k at that image height position, which is shown in the magnification chromatic aberration information, and sets the product as the amount of magnification chromatic aberration Δ. Here, the amount of magnification chromatic aberration Δ is the amount of shift (the amount of color shift) of the image-forming position of light including G components from the image-forming position of light including R components or B components. The shift occurs by the magnification chromatic aberration at the image height position to be processed, on the luminance image.

Specifically, it is assumed that the image height position to be processed is the position of eight-tenths of the image height position, and the length $r_8$=2683, for example. Further, it is assumed that the correction magnification k at the position of eight-tenths of the image height position is: k=−0.0009. In this case, the amount of magnification chromatic aberration Δ at the position of eight-tenths of the image height position is: Δ=2683*(−0.0009)=−2.4 (pixels). At that time, for example, when the threshold value th is 2 (pixels), the absolute value of the amount of magnification chromatic aberration Δ, which is −2.4, is equal to or larger than the threshold value th. Thus, it is determined in Step S77 that the absolute value is equal to or larger than the threshold value.

More specifically, the magnification aberration amount determination unit 50 calculates the amount of magnification chromatic aberration $\Delta_R$ and the amount of magnification chromatic aberration $\Delta_B$. The amount of magnification chromatic aberration $\Delta_R$ is obtained using the R correction magnification, which serves as the magnification chromatic aberration information, as the correction magnification k. The amount of magnification chromatic aberration $\Delta_B$ is obtained using the B correction magnification, which serves as the magnification chromatic aberration information, as the correction magnification k.

When the absolute value of the amount of magnification chromatic aberration $\Delta_R$ is less than the threshold value th and the absolute value of the amount of magnification chromatic aberration $\Delta_B$ is less than the threshold value th, in Step S77, the magnification aberration amount determination unit 50 determines that the absolute value of the amount of magnification chromatic aberration is not equal to or larger than the threshold value. In other words, when any one of the absolute value of the amount of magnification chromatic aberration $\Delta_R$ and the absolute value of the amount of magnification chromatic aberration $\Delta_B$ is equal to or larger than the threshold value th, in Step S77, the magnification aberration amount determination unit 50 determines that the absolute value of the amount of magnification chromatic aberration is equal to or larger than the threshold value th.

It should be noted that for the image height position for which the magnification chromatic aberration information does not include the correction magnification k, the correction magnification k is calculated by interpolation processing as appropriate. Further, the example in which both of the R correction magnification and the B correction magnification are used has been described here, but any one of the R correction magnification and the B correction magnification may be used to determine the amount of magnification chromatic aberration.

Furthermore, when the amount of magnification chromatic aberration is equal to or larger than the threshold value th, the threshold value th is considered as a value at which a color shift due to the magnification chromatic aberration is seen as blurring in the luminance image. For example, the threshold value th is set to 2.

Additionally, for example, in the case where the difference in size between the monochrome image sensor 42 and the color image sensor 43 is large, and when enlargement processing is performed in which the size of the luminance image obtained from the color image is enlarged to be the same size as the recording image, a reduction in resolution may occur by the enlargement processing. Hence, in such a case, the threshold value th may be determined while considering to what amount of magnification chromatic aberration the reduction in resolution caused by the enlargement processing corresponds.

In Step S77, when determining that the absolute value of the amount of magnification chromatic aberration is less than the threshold value, the magnification aberration amount determination unit 50 supplies a replacement signal to the recording image selection unit 51, the replacement signal indicating that replacement with the luminance image obtained from the color image is not performed. The processing proceeds to Step S78.

In Step S78, the recording image selection unit 51 selects, as a recording image, the luminance image obtained with the monochrome image sensor 42 in accordance with the replacement signal supplied from the magnification aberration amount determination unit 50. The recording image selection unit 51 then outputs the recording image to the recording unit 52.

In other words, the recording image selection unit 51 selects an image of an area, which includes pixels at the image height position to be processed, in the luminance image supplied from the monochrome image sensor 42, and then sets the selected image as an image of an area, which includes pixels at the image height position to be processed, in the recording image.

For example, when the image height position to be processed is the position of x-tenths of the image height position, an image of an area including pixels on a circle (on the circumference of a circle) in the luminance image obtained in the monochrome image sensor 42, the circle having a radius $r_x$ centering on the center position of the luminance image, is set to be an image of an area including pixels on a circle in the recording image, the circle having a radius $r_x$ centering on the center position of the recording image.

When the amount of magnification chromatic aberration is small at the image height position to be processed, blurring resulting from the magnification chromatic aberration is small in an area at the image height position to be processed in the luminance image captured with the monochrome image sensor 42, and a large reduction in resolution does not occur.

In this regard, at the image height position at which the amount of magnification chromatic aberration is small, the recording image selection unit 51 sets the luminance image captured with the monochrome image sensor 42 to a recording image as it is.

In such a manner, when an image at the image height position to be processed in the luminance image obtained with the monochrome image sensor 42 is selected as a recording image, the processing then proceeds to Step S81.

In contrast to this, in Step S77, when determining that the absolute value of the amount of magnification chromatic aberration is equal or larger than the threshold value, the magnification aberration amount determination unit 50 supplies a replacement signal to the recording image selection unit 51, the replacement signal indicating that replacement with the luminance image obtained from the color image is performed. The processing proceeds to Step S79.

It should be noted that in this case, more specifically, an instruction for executing the image size conversion processing is supplied from the magnification aberration amount determination unit 50 to the image size conversion unit 49.

In Step S79, the image size conversion unit 49 performs image size conversion processing on the luminance image, which is generated from the color image obtained with the color image sensor 43 and is supplied from the YC conversion unit 47. The image size conversion unit 49 then supplies the resultant luminance image to the recording image selection unit 51.

For example, the image size conversion unit 49 performs filter processing using bicubic filtering on the luminance image, and thus converts the luminance image constituting the color image into an image having the same size as the luminance image obtained with the monochrome image sensor 42, i.e., an image having the same size as the recording image. It should be noted that the image size conversion processing is not limited to the filter processing using bicubic filtering and may be any processing.

In Step S80, the recording image selection unit 51 selects the size-changed luminance image as a recording image in accordance with the replacement signal supplied from the magnification aberration amount determination unit 50. The recording image selection unit 51 then outputs the selected recording image to the recording unit 52.

In other words, the recording image selection unit 51 selects an image of an area, which includes pixels at the image height position to be processed, in the luminance image that constitutes the color image and is supplied from the image size conversion unit 49, and then sets the selected image as an image of an area, which includes pixels at the image height position to be processed, in the recording image.

For example, when the image height position to be processed is the position of x-tenths of the image height position, an image of an area including pixels on a circle in the luminance image supplied from the image size conversion unit 49, the circle having a radius $r_x$ centering on the center position of the luminance image, is set to be an image of an area including pixels on a circle in the recording image, the circle having a radius $r_x$ centering on the center position of the recording image.

When the amount of magnification chromatic aberration is large at the image height position to be processed, blurring resulting from the magnification chromatic aberration is large in an area at the image height position to be processed in the luminance image captured with the monochrome image sensor 42, and a reduction in resolution occurs.

In this regard, at the image height position at which the amount of magnification chromatic aberration is large, the recording image selection unit 51 sets the luminance image, which constitutes the color image for which the magnification chromatic aberration is corrected, as a recording image, instead of the luminance image that is captured with the monochrome image sensor 42 and is to be originally a recording image. In other words, the luminance image captured for recording is partially replaced with the luminance image obtained from the color image.

In such a manner, when an image of the image height position to be processed in the luminance image supplied from the image size conversion unit 49 is selected as a recording image, the processing then proceeds to Step S81.

In Step S78 or Step S80, when an image to be a recording image is selected, in Step S81, the camera unit 22 determines whether all the image height positions are processed as the image height position to be processed.

In Step S81, when it is determined that all the image height positions are not yet processed, the processing returns to Step S76 and the above-mentioned processing is repeated. In other words, a new image height position is selected as the image height position to be processed, and an image to be a recording image at that image height position is selected.

It should be noted that the processing for the image height positions at intervals of one-tenth (10 percent) has been described above. More specifically, for the image height positions located between those intervals of one-tenth (10 percent), interpolation processing using a correction magnification k of adjacent image height positions is performed to calculate a correction magnification of those image height positions, to perform the above-mentioned processing. In other words, for the image height positions located between those intervals of one-tenth (10 percent), a correction magnification calculated by the interpolation processing is used to select a luminance image that is to be a recording image.

Further, in Step S81, when it is determined that all the image height positions are processed, it is considered that a recording image constituted by the selected luminance image is obtained for each image height position. The processing proceeds to Step S82.

In Step S82, the recording unit 52 supplies the recording image, which is supplied from the recording image selection unit 51, to a recording medium (not shown) for recording, and the imaging processing is terminated.

At that time, the recording unit 52 converts the recording image into an image with a predetermined format such as JPEG (Joint Photographic Experts Group) as necessary, and then records the recording image on a recording medium.

As described above, the imaging apparatus 11 selects, as a recording image, any one of the luminance image obtained with the monochrome image sensor 42 and the luminance image constituting the color image obtained with the color image sensor 43, for each image height position, and generates a recording image.

In such a manner, since the luminance image with less reduction in resolution is selected as a recording image for each image height position, even when the luminance image is captured with the monochrome image sensor 42, a higher-quality luminance image with less blurring resulting from the magnification chromatic aberration can be obtained.

It should be noted that, in this example, the luminance image is selected at each image height position to be set as a recording image. Thus, the luminance image obtained with the monochrome image sensor 42 and the luminance image constituting the color image obtained with the color image sensor 43 are basically synthesized at each image height position by the recording unit 52, to generate a recording image. However, depending on the amount of magnification chromatic aberration at each image height position, the luminance image obtained with the monochrome image sensor 42 or the luminance image constituting the color image obtained with the color image sensor 43 may be set as a recording image as it is.

Further, in the case where the amount of magnification chromatic aberration at each image height position is small as a whole, even when the absolute value of the amount of magnification chromatic aberration at a predetermined image height position is equal to or larger than the threshold value, the luminance image obtained with the monochrome image sensor 42 may be set as a recording image.

Conversely, in the case where the amount of magnification chromatic aberration at each image height position is large as a whole, even when the absolute value of the amount of magnification chromatic aberration at a predetermined image height position is less than the threshold value, the luminance image obtained from the color image may be set as a recording image.

Specifically, it may be possible to select not a luminance image to be a recording image at each image height position, but one luminance image as it is as a recording image on the basis of the amounts of magnification chromatic aberration at all the image height positions.

Further, the example in which the size of the monochrome image sensor 42 is larger than the size of the color image sensor 43 has been described above, but the size of the color image sensor 43 may be larger than the size of the monochrome image sensor 42.

In such a case, for example, the luminance image obtained with the monochrome image sensor 42 is subjected to enlargement processing in the recording image selection unit 51 and the like, and the luminance image constituting the color image is supplied as it is to the recording image selection unit 51.

Furthermore, for example, the luminance image obtained with the monochrome image sensor 42 may be supplied as it is to the recording image selection unit 51, and the luminance image constituting the color image may be reduced and then supplied to the recording image selection unit 51.

Incidentally, a series of processing described above can be executed by hardware or software. In the case where the series of processing is executed by software, a program constituting the software is installed in a computer. Here, the computer includes a computer incorporated in dedicated hardware, a general-purpose computer that can execute various functions by installing various programs therein, and other computers.

Figure 9:
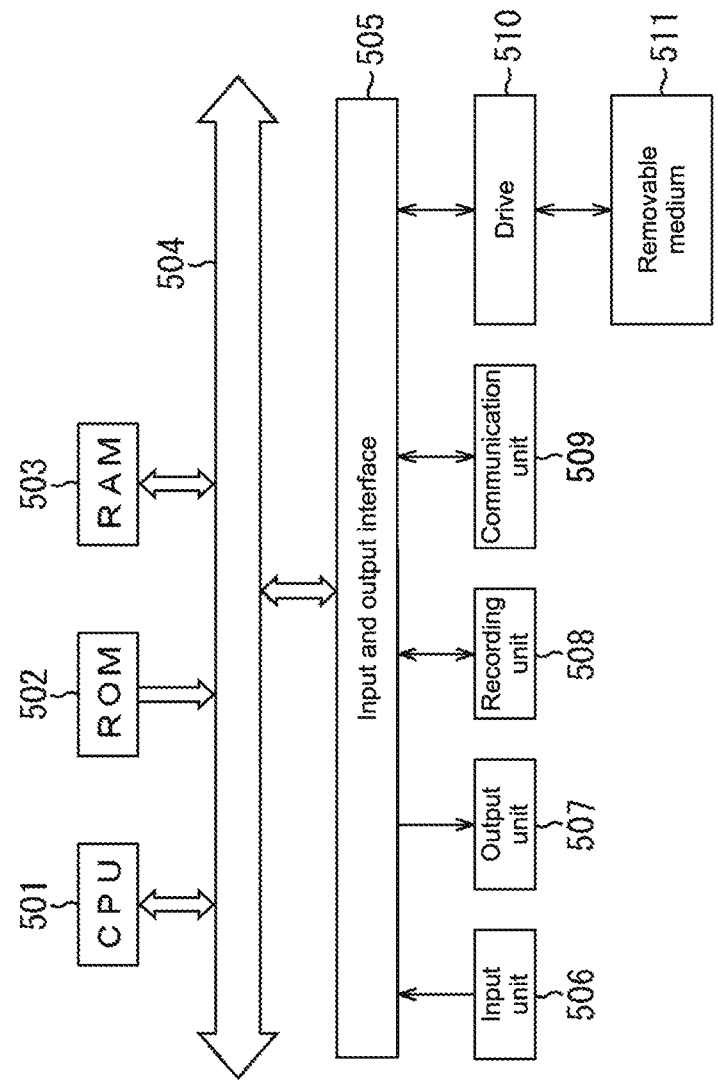
FIG. 9 is a diagram showing a configuration example of a computer.

FIG. 9 is a block diagram showing a hardware configuration example of a computer that executes the above-mentioned series of processing by a program.

In the computer, a CPU (Central Processing Unit) 501, a ROM (Read Only Memory) 502, and a RAM (Random Access Memory) 503 are connected to one another via a bus 504.

The bus 504 is also connected to an input and output interface 505. The input and output interface 505 is connected to an input unit 506, an output unit 507, a recording unit 508, a communication unit 509, and a drive 510.

The input unit 506 includes a keyboard, a mouse, a microphone, a plurality of imaging elements, and the like. In this example, two imaging elements constituting the input unit 506 correspond to the monochrome image sensor 42 and the color image sensor 43. The output unit 507 includes a display, a speaker, and the like. The recording unit 508 includes hard disk, a non-volatile memory, and the like. The communication unit 509 includes a network interface and the like. The drive 510 drives a removable medium 511 such as a magnetic disc, an optical disc, a magneto-optical disc, and a semiconductor memory.

In the computer configured as described above, the CPU 501 loads a program, which is recorded in, for example, the recording unit 508, to the RAM 503 via the input and output interface 505 and the bus 504 for execution, and the above-mentioned series of processing is thus performed.

The program executed by the computer (CPU 501) can be recorded on the removable medium 511 serving as a package medium or the like, and then provided. Further, the program can be provided via a wired or wireless transmission medium such as a local area network, the Internet, and digital satellite broadcasting.

In the computer, the program can be installed in the recording unit 508 via the input and output interface 505 when the removable medium 511 is mounted to the drive 510. Further, the program can be received in the communication unit 509 via the wired or wireless transmission medium and then installed in the recording unit 508. In addition, the program can be installed previously in the ROM 502 or the recording unit 508.

It should be noted that the program executed by the computer may be a program that is processed chronologically along the described order in this specification or may be a program that is processed in parallel or at a necessary timing such as when an invocation is performed.

Further, embodiments of the present technology are not limited to the embodiment described above and can be variously modified without departing from the gist of the present technology.

For example, the present technology can have a configuration of cloud computing in which a plurality of apparatuses share one function and cooperate to perform processing via a network.

Further, the steps described in the flowcharts described above can be executed by one apparatus or shared and executed by a plurality of apparatuses.

In addition, in the case where one step includes a plurality of processing steps, the plurality of processing steps in one step can be executed by one apparatus or shared and executed by a plurality of apparatuses.

Further, the effects described in this specification are merely exemplary and are not restrictive, and any other effects may be produced.

Furthermore, the present technology can have the following configurations.

(1) An imaging apparatus, including:
a magnification chromatic aberration correction unit that performs magnification chromatic aberration correction on a color image, the color image being obtained by imaging of a subject via a lens unit; and
an image selection unit that selects and outputs any one of a first luminance image and a second luminance image on the basis of the amount of magnification chromatic aberration of the lens unit, the first luminance image being obtained by the imaging of the subject via the lens unit, the second luminance image being obtained from the color image subjected to the magnification chromatic aberration correction.

(2) The imaging apparatus according to (1), in which the image selection unit selects any one of the first luminance image and the second luminance image for each image height.

(3) The imaging apparatus according to (2), in which the image selection unit selects the second luminance image, when an absolute value of the amount of magnification chromatic aberration at the image height is equal to or larger than a threshold value.

(4) The imaging apparatus according to any one of (1) to (3), further including an image size conversion unit that converts a size of the second luminance image into the same size as the first luminance image, in which
the image selection unit selects any one of the first luminance image and the second luminance image having the size converted by the image size conversion.

(5) The imaging apparatus according to any one of (1) to (4), further including:
a color-image capturing unit that captures the color image; and
a luminance-image capturing unit that captures the first luminance image.

(6) The imaging apparatus according to (5), in which the color-image capturing unit and the luminance-image capturing unit have different sizes.

(7) The imaging apparatus according to any one of (1) to (6), further including an image conversion unit that converts the color image into the second luminance image, the color image including images of respective color components of R, G, and B.

(8) An imaging method, including the steps of:
performing magnification chromatic aberration correction on a color image, the color image being obtained by imaging of a subject via a lens unit; and
selecting and outputting any one of a first luminance image and a second luminance image on the basis of the amount of magnification chromatic aberration of the lens unit, the first luminance image being obtained by the imaging of the subject via the lens unit, the second luminance image being obtained from the color image subjected to the magnification chromatic aberration correction.

(9) A program causing a computer to execute processing including the steps of:
performing magnification chromatic aberration correction on a color image, the color image being obtained by imaging of a subject via a lens unit; and
selecting and outputting any one of a first luminance image and a second luminance image on the basis of the amount of magnification chromatic aberration of the lens unit, the first luminance image being obtained by the imaging of the subject via the lens unit, the second luminance image being obtained from the color image subjected to the magnification chromatic aberration correction.

DESCRIPTION OF SYMBOLS 11 imaging apparatus
32 lens unit
42 monochrome image sensor
43 color image sensor
44 lens information reception unit
45 magnification chromatic aberration correction unit
47 YC conversion unit
49 image size conversion unit
50 magnification aberration amount determination unit
51 recording image selection unit

The invention claimed is:

1. An imaging apparatus, comprising:
at least one processor configured to:
execute magnification chromatic aberration correction on a color image, wherein the color image is obtained by image capture of a subject; and
select and output one of a first luminance image or a second luminance image based on an amount of magnification chromatic aberration of a lens unit, wherein the first luminance image is obtained by the image capture of the subject, and the second luminance image is obtained from the color image subjected to the magnification chromatic aberration correction.

2. The imaging apparatus according to claim 1, wherein the at least one processor is further configured to select one of the first luminance image or the second luminance image for each image height.

3. The imaging apparatus according to claim 2, wherein the at least one processor is further configured to select the second luminance image, based on a determination that an absolute value of the amount of magnification chromatic aberration at a respective image height is equal to or larger than a threshold value.

4. The imaging apparatus according to claim 1, wherein the at least one processor is further configured to:
convert a size of the second luminance image into a same size as the first luminance image; and
select one of the first luminance image or the second luminance image having the converted size.

5. The imaging apparatus according to claim 1, wherein the at least one processor is further configured to:
cause a color image sensor to capture of the color image; and
cause a monochrome image sensor to capture the first luminance image.

6. The imaging apparatus according to claim 5, wherein the color image sensor and the monochrome image sensor have different sizes.

7. The imaging apparatus according to claim 1, wherein the at least one processor is further configured to convert the color image into the second luminance image, wherein the color image includes images of respective color components of R, G, and B.

8. An imaging method, comprising:
   executing magnification chromatic aberration correction on a color image, wherein the color image is obtained by imaging of a subject; and
   selecting and outputting one of a first luminance image or a second luminance image based on an amount of magnification chromatic aberration of a lens unit, wherein the first luminance image is obtained by the imaging of the subject, and the second luminance image is obtained from the color image subjected to the magnification chromatic aberration correction.

9. A non-transitory computer-readable medium, having stored thereon, computer-executable instructions, which when executed by a computer, cause the computer to execute operations, the operations comprising:
   executing magnification chromatic aberration correction on a color image, wherein the color image is obtained by imaging of a subject; and
   selecting and outputting one of a first luminance image or a second luminance image based on an amount of magnification chromatic aberration of a lens unit, wherein the first luminance image is obtained by the imaging of the subject, and the second luminance image is obtained from the color image subjected to the magnification chromatic aberration correction.

* * * * *